Nov. 14, 1961   F. J. CLAWSON ET AL   3,008,575
METHOD AND APPARATUS FOR DESLIMING PHOSPHATE MATRIX
Filed June 30, 1958   2 Sheets-Sheet 1
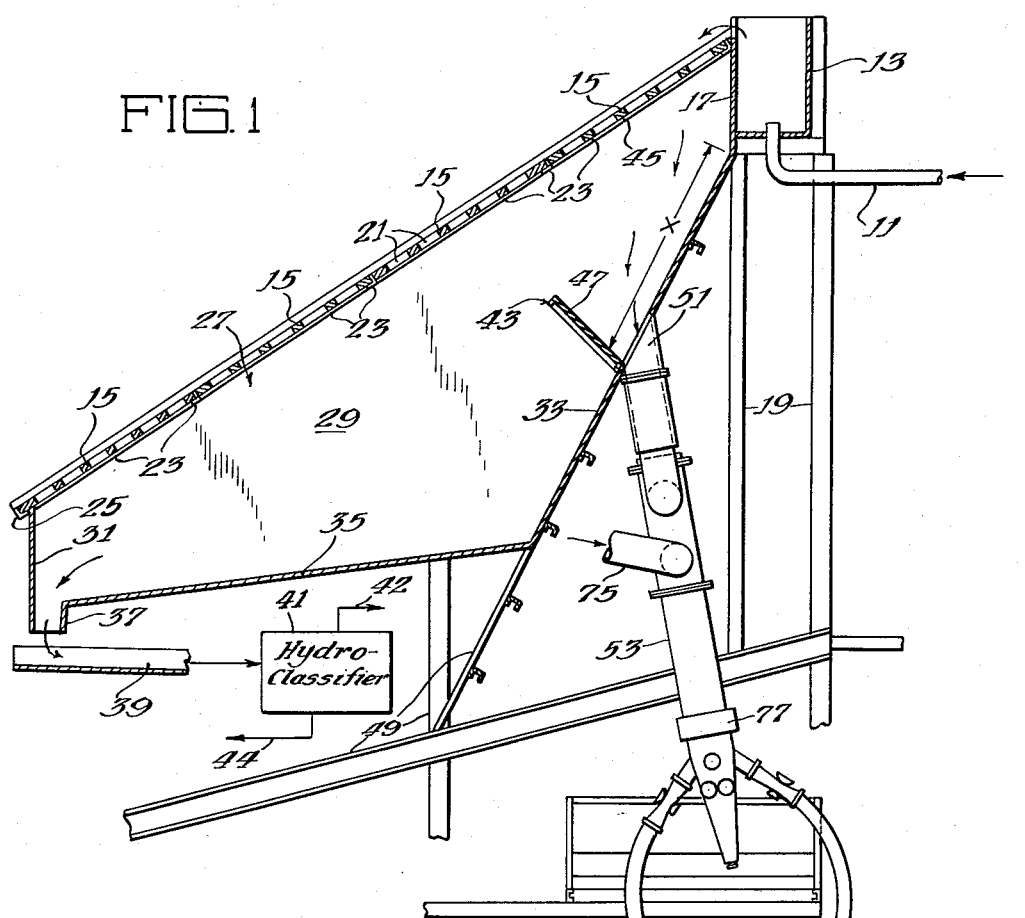
FIG.1
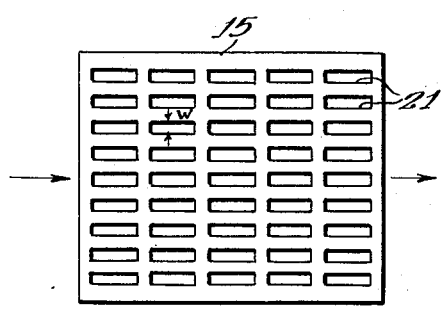
FIG.2
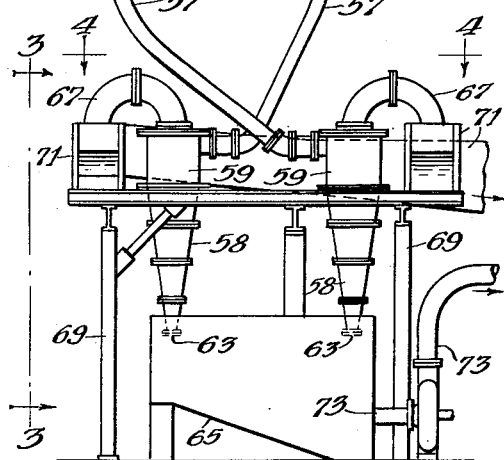
Inventors:
Floyd J. Clawson
Walter O. McClintock
By: Ernest V. Haines
Attorney:

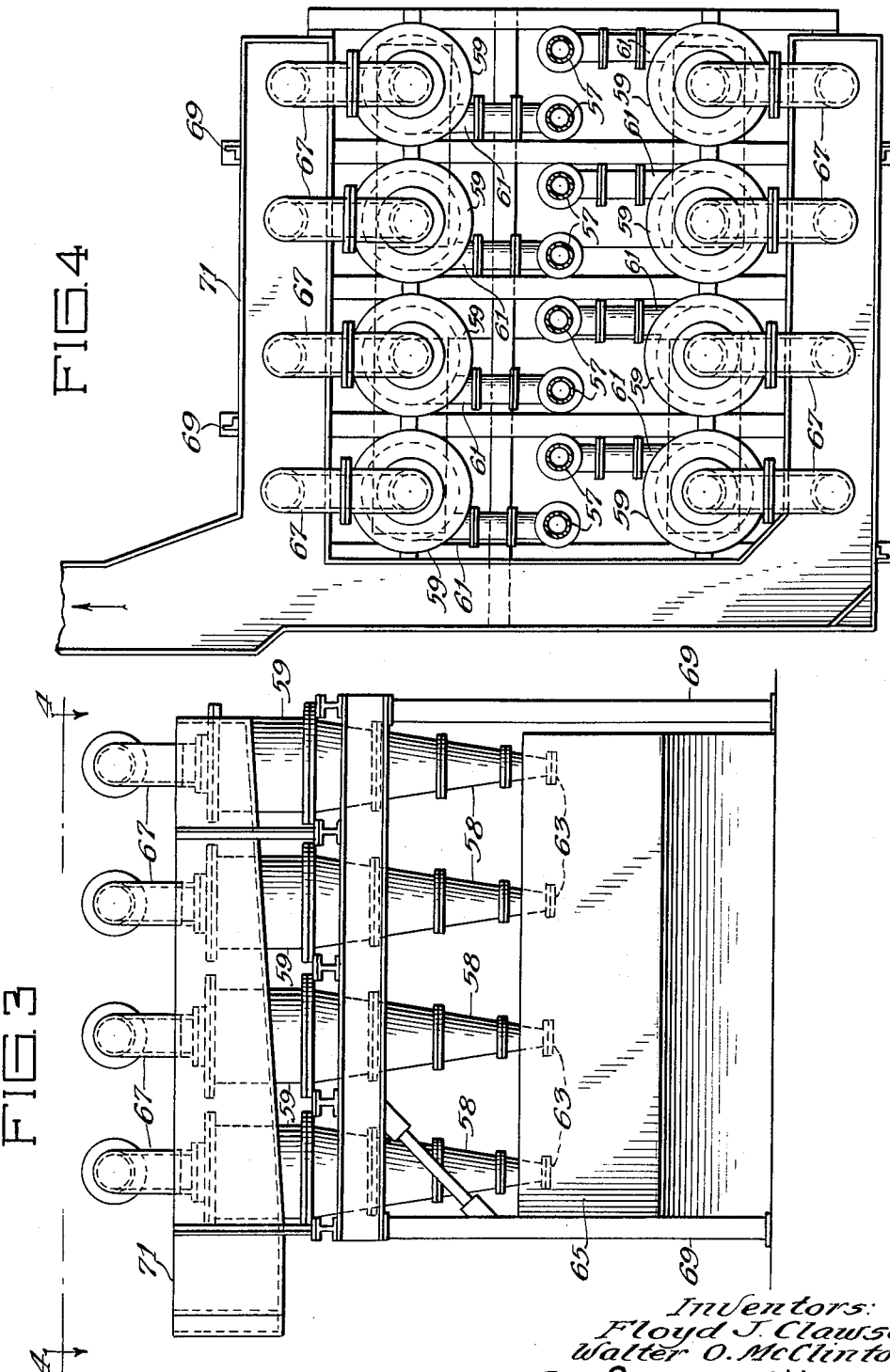

United States Patent Office 3,008,575
Patented Nov. 14, 1961

3,008,575
METHOD AND APPARATUS FOR DESLIMING PHOSPHATE MATRIX
Floyd J. Clawson, Glenview, Ill., and Walter O. McClintock, Bartow, Fla., assignors to International Minerals & Chemical Corporation, a corporation of New York
Filed June 30, 1958, Ser. No. 745,756
6 Claims. (Cl. 209—12)

The present invention relates generally to improvements in the art of desliming phosphate matrix. The invention more particularly relates to a method and apparatus for desliming Florida pebble phosphate matrix, which method and apparatus include a novel combination of flat screening and hydroconing.

Large deposits of pebble phosphate exist in Hillsborough, Polk, Manatee, and Hardee Counties in Florida. These deposits occur about 15 feet below the surface of the ground and the deposits themselves average 20 feet in thickness. The material in these deposits is designated in the field as matrix. Due to the relative shallowness of these deposits and the softness of the overburden, the matrix is mined by open pit methods.

The phosphate matrix is chiefly made up of three constituents: clay, silica sand, and the phosphate pebble. The clay or slimes is largely −5 microns in size; however, some of the slime particles are larger. The silica sand is largely −1 millimeter. The phosphate in the matrix is found as somewhat rounded pellets or pebbles having a wide range of sizes. Most of the pebble ranges in size from a small quantity at 1½ to 2 inches down to 400 mesh. Some of the pellets are −400 mesh.

In present day mining operations, the overburden is removed by draglines to expose the matrix. The matrix is then mined by draglines and dropped into what is called a well, which is a pit dug out of the surface of the overburden.

The suction end of a large slurry pump is dropped into the well, into which the matrix is dropped, and the mined matrix is washed into the suction of the pump by means of hydraulic guns, which may be manually or automatically operated. The hydraulic pressure from the guns breaks down the mud in the matrix and washes the matrix as a slurry to the pump suction. From this point the matrix is pumped to the plant.

In very early operations in Florida, the processing steps in the plant usually involved a simple washing and scrubbing operation. The matrix was sent to a washer which consisted of screens and log washers. When the matrix had been sufficiently disintegrated, the slimes washed out, and the granular materials screened on 1 mm., it was found that the +1 mm. was a saleable grade of phosphate rock. The −1 mm. fine granular material which passed through the 1 mm. screens contained a large proportion of the phosphatic values mined; however, because of the large amount of silica present, its grade was too low to be saleable and there was no known method for concentration. Consequently, the −1 mm. material was dumped, with the slimes and overburden, into mined out areas.

Since a large proportion of the phosphate values are present in the −1 mm. material, methods were subsequently devised to recover the phosphate values from this material. At the present time, there are two processes used in concentrating the −1 mm. material. One of these involves agglomerate flotation of the −1 mm. +35 mesh material, and the other process involves cell flotation of the −35 mesh +200 mesh material, in which processes flotation reagents are usually used.

It was soon discovered that in order to have efficient beneficiation of the phosphate values in the −1 mm. fraction, it was necessary to remove slimes since they had a very adverse effect on flotation reagents. These slime particles are very fine, have a large surface, and tend to absorb the reagent, thereby making the cost of using a reagent prohibitive. Further, most beneficiation methods do not operate efficiently on −200 mesh material. In many instances, the −150 mesh material is preferably removed. Since the slimes are predominantly −200 mesh, they are removed in an operation which separates the +200 mesh material from the fine −200 mesh material. The removal of fine material, which includes the slimes, is usually referred to as a desliming operation.

In the description of this invention, for the sake of simplicity, the fine material will be referred to as the −200 mesh fraction and this fraction will also contain slimes. It will be understood, however, that the sizing of the fine material may be on a different mesh, for example, 150 mesh, 250 mesh, 325 mesh, etc. The mesh size refers to Tyler Standard screen sizes. Further, the initial screening is preferably on 1 mm., however, the screening may be performed on other sizes.

As hereinbefore set forth, the matrix is delivered to the plant as a water slurry, usually denominated a pulp. This pulp contains some mud balls and lime rock up to 8 inches in diameter. It is necessary for the coarse mud balls and the lime rock to be disintegrated into smaller size before further processing. Following the heretofore conventional methods, the pulp was discharged into a screen tub launder with a 1 mm. slotted flat screen in the bottom. A large proportion of the slimes, fines, and water immediately passes through this screen. The coarser material was delivered to a trommel which removed everything plus two inches. At the present time, it is general practice in the field to break down this oversize material by the use of hammer mills. The product, reduced in size, is then returned to the head of the washer. All of the washer reject will pass through the 1 mm. flat screen. The −1 mm. material passing through the flat screen is denominated washer debris.

The −1 mm. material which passed through the flat screen was then processed to remove the slimes. The usual method of accomplishing this was by introducing the washer debris to a large diameter hydro-classifier from where the slimes, −200 mesh overflow, were sent to waste and the +200 mesh underflow was further beneficiated. Another method previously used was to send the washer debris to a multiple unit cone classifier which separated the −200 mesh slimes from the phosphate values and discharged the values at a high percent solids.

The present invention is concerned with the removal of slimes and fine material from Florida pebble phosphate matrix and it is, accordingly, an object of this invention to provide a method and apparatus for desliming phosphate matrix.

Another object of the present invention is to provide a method and apparatus for removing −200 mesh material from Florida pebble phosphate matrix.

A further object of the present invention is to provide a phosphate charge to a phosphate beneficiation process which is substantially free of −200 mesh material.

It is an additional object of the invention to provide a process and apparatus for desliming phosphate matrix which are appropriate for installation in a conventional commercial plant.

Further objects and advantages of the present invention will be apparent from the following description and drawings which illustrate one form of the invention.

In the drawings:

FIGURE 1 is a side-elevational view, partly in section, of an apparatus embodying various features of the present invention. A hydro-classifier is illustrated diagrammatically.

FIGURE 2 is an enlarged plan view of a portion of a flat screen used in the apparatus shown in FIGURE 1.

FIGURE 3 is an enlarged fragmentary view of apparatus shown in FIGURE 1, taken along line 3—3 of FIGURE 1.

FIGURE 4 is an enlarged fragmentary view of the apparatus shown in FIGURE 1, taken along line 4—4 of FIGURE 1.

Now, in accordance with this invention, it has been discovered that phosphate matrix can be efficiently deslimed by passing a water slurry of the matrix, as pumped from the mine, down an inclined flat screen, subjecting a portion of the material which passes through the flat screen to a hydroconing operation and recovering the denser phase from the hydroconing operation.

One of the early objections ot any use of hydroconing in a commercial processing plant was the high cost of the power necessary to supply the pulp to the cones in large volumes and high pressures believed necessary for efficient operation of the cones. In the present invention, this objection is removed since the phosphate matrix is flowed only by gravity into the hydrocones. This is an extremely important economic advantage and it may, therefore, readily be seen that this invention is an important contribution to the desliming art.

Another objection to the use of hydrocones was that in order to obtain efficient operation of the hydrocone, the rate of flow thereto had to be relatively constant. Owing to the manner of mining of phosphate matrix, the flow into a commercial plant is erratic and it, therefore, is not practical to use hydrocones alone to perform the desliming operation. In the present invention, a relatively uniform rate of flow of material at a relatively constant pressure is provided to the hydrocones.

In accordance with this invention, the phosphate matrix delivered to the plant as a slurry or pulp is pumped to an elevated position so that the pulp may descend, under gravity flow, down an inclined flat screen for a flat screening operation. The material passing through the screen is usually denominated the underflow. It has been found that the material passing through the initial section of the flat screen is particularly suitable for use in a hydroconing operation. The material which passes through the flat screen, and which is not hydroconed, is processed in the conventional manner in a hydro-classifier. It has been determined that this material may readily be deslimed in a hydro-classification operation. The combination of flat screening and hydroconing has proved to be highly efficient and has provided a very low slime-containing feed for the beneficiation section of the plant wherein the deslimed material is subjected to agglomerate flotation or cell flotation.

The invention may readily be understood by reference to the drawings which illustrate a method and apparatus for desliming phosphate ore, embodying various features of the invention. The drawings are intended merely to illustrate the general application of the instant invention and are not to be considered a limitation thereon. Modifications of the process and apparatus illustrated in the drawings, while employing the principles of the instant invention will be apparent to those familiar with the desliming art.

In FIGURE 1, phosphate ore as mined is pumped as a pulp to an elevated position through conduit 11 and passes into a receptacle, termed a hopper box or surge tank 13. The surge tank 13 is provided to widen the stream of pulp and to distribute it at a more even rate to a flat screen 15.

The surge tank 13 is of the open top type and one of the upwardly extending walls 17 is shorter than the others so that the pulp in the tank 13 flows over the top edge of this wall 17. The surge tank 13 is supported in an elevated position by suitable support members 19. The pulp overflowing from the surge tank 13 is directed to an upper portion of an inclined flat screen 15.

It has been determined that the screen 15 should be of the flat surfaced type, since it has been found that a flat screening operation produces good results. The flat screen 15 is usually punched plate or sheet metal. The flat screen 15 preferably has slotted holes 21 (FIG. 2) therein and may have the slots positioned hit-and-miss sideways, hit-and-miss endways, or in straight parallel rows as illustrated in FIGURE 2. A further discussion and illustration of slots of this type in flat screens may be found in Taggart, Handbook of Mineral Dressing, chapter 3, pages 14–15 of the 1945 edition. The flat screens are preferably positioned so that the long dimension of the slotted holes 21 is parallel to the main direction of flow along the surface of the flat screen as shown in FIGURE 2.

As shown in FIGURE 1, the flat screen 15 is in four parts which are suitably supported as by angle iron members 23. By fabricating the flat screen in parts, only the parts that wear out need be replaced and the smaller size facilitates the replacement operation. In a commercial embodiment of this apparatus, each part of flat screen was 16 gauge (0.065 inch) plate 3′ x 2½′, and the holes were 1 mm. by ½″. The flat screen 15 is inclined downwardly from the surge tank 13 at an angle to insure that substantially all of the large particles in the pulp will flow down the flat screen. It has been found that an inclination of about 35° from the horizontal has produced good results. The length of the flat screen measured downward along the incline is preferably sufficient so that substantially all of the material which is smaller than the size of the holes in the flat screen passes through the holes before the material drops off of the lower end of the screen. As hereinbefore set forth, the screening is preferably on 1 mm. and accordingly the width of the slots, designated "W" in FIGURE 2, is preferably 1 mm. Other sizes may, however, be used.

As the pulp flows down the flat screen 15, most of the water and the −1 mm. material passes through the openings in the flat screen and the +1 mm. material drops off the lower end 25 of the flat screen and is collected in any suitable manner. The +1 mm. material may be comminuted and recirculated to the process. It has been determined that the −1 mm. material passing through the initial section 45 of the flat screen has a higher percent of −150 mesh material than the −1 mm. material subsequently passing through the flat screen. Some sizing of −150 mesh material, therefore, takes place on the flat screen. Also, a substantial portion of −400 mesh material passes through the initial section of the flat screen. Hydrocones operate efficiently when the amount of −150 mesh material is high and the presence of −400 mesh material does not substantially hinder the operation of the hydrocones. The −1 mm. material passing through the initial section 45 of the flat screen 15, is, therefore, a suitable feed for a hydroconing operation.

Previous to this invention, all of the material which passed through the flat screen, which material is usually denominated the underflow, was collected and passed to a hydro-classification system. Therefore, any benefits resulting from the sizing of fine materials on the flat screen were lost since all of the −1 mm. was collected together. Referring to FIGURE 1 of the drawing, in the previous operation all of the −1 mm. underflow was collected in a box-like structure 27 which is defined by vertical walls 29, only one of which is shown in the sectional view, a vertical wall 31, an inclined wall 33, depending from the surge tank 13, and a slightly inclined lower wall 35. The walls 33 and 35 are inclined to direct the −1 mm. material out of the box-like structure 27 through a spout 37. The spout 37 directs the −1 mm. material into a launder 39 which conveys the material to a hydro-classifier 41 which is shown diagrammatically in FIGURE 1. From the hydro-classifier, the −150 mm. material is withdrawn as overflow through line 42 and the +150 mm. material is withdrawn as underflow through line 44.

In accordance with the present invention, a means 43 is now provided below and under the flat screen to collect the −1 mm. material passing through an initial section 45 of the flat screen 15. The means 43 preferably collects material that passes through a portion of the upper half of the flat screen 15, that is, the initial half of the flat screen which the pulp passes over. Since the −150 mesh material rapidly passes through the flat screen, as is hereinbefore mentioned, the means 43 preferably collects material which passes through the initial 30% of the flat screen. This −1 mm. material which passes through the initial or upper 30% of the flat screen 15 contains a large portion of the −150 mm. material and is particularly amenable to treatment in a hydrocone. The means 43, illustrated, includes the inclined wall 33 and a baffle or weir splitter 47 which extends upwardly from the inclined wall 33. The baffle splits or divides the underflow of the flat screen 15. The baffle 47 extends across the box-like structure 27 between the vertical walls 29 and is transverse to the incline of the flat screen 15. The box-like structure 27 is suitably supported by support members 19 and 49. In a commercial embodiment, the angle between the upper section of the wall 33 and the baffle 47 was 72°.

The −1 mm. material which passes through an initial section of the flat screen 15 and which is separately collected between the baffle 47 and the upper section of the inclined wall 33 is withdrawn from the box-like structure 27 through a conduit 51. The rate of withdrawal of −1 mm. material through the conduit 51 is usually less than the amount of material coming through the initial section of the flat screen and, therefore, some material flows over the upper edge of the baffle 47. The conduit 51 connects with a distributor 53 which distributes the material at a substantially uniform flow rate through a plurality of connecting conduits 57. Each of the conduits 57 in turn delivers the material to a hydrocone 59 for a hydroconing operation. The hydrocones 59 are positioned below the collecting means 43. Each hydrocone 59 is a closed top cyclone. The feed material is fed tangentially into the hydrocone 59 through a feed inlet conduit 61. In the hydrocone 59 a separation is made in the cone-shaped part 58 by the action of centrifugal and centripetal forces. The heavier portion of the material, which contains the major portion of the phosphate values introduced to the cone, leaves the cone as underflow at the apex opening 63 and empties into a tank 65. The lighter portions of the feed, which consists of −150 mesh material including slimes, leaves the cone 59 as overflow through a conduit 67 which connects with the top of the cone. A further discussion of cones of this type may be found in Perry, Chemical Engineer's Handbook, third edition. The cones are suitably supported by support members 69. The conduits 67 empty into a launder 71 which conveys the −150 mesh material to a disposal point where it may be disposed of as waste or further processed.

In the drawings, a battery of eight cyclones 59 is illustrated. A greater or lesser number may, however, be used.

The substantially slime-free material in tank 65 may be withdrawn through a conduit 73 (FIG. 1) and sent directly to the flotation plant for further beneficiation. In a preferred operation, the material in conduit 73 is combined with the underflow from the classifier in line 44 and at least a portion of the combined stream is beneficiated with the use of flotation reagents.

The feed to the cyclones is, of course, somewhat erratic in solids content because of the type of mining and delivery to the plant, as has been set forth. With the operation conducted so that there is an overflow over the baffle 47, there is, however, a constant pressure head on the cones. This is an important feature of this invention. It should also be noted that since the pulp is conducted to an elevated position for the flat screening operation, no additional pumping facilities are necessary to deliver the feed to the cones, since the elevation is used in providing a gravity feed directly to the hydrocones 59.

In order to provide a feed to the hydrocones 59 of more uniform solids content, an inlet conduit 75 is connected into the distributor 53. Water is introduced through this conduit 75 at a rate required to maintain the solids content of the feed to the cones 59 substantially constant.

A density meter 77 is also preferably connected into the distributor 53 adjacent to where the conduits 57 connect to the distributor. The density meter 77 measures the density of the feed to the cones 59, which density is directly related to the solids content. The density meter may be connected (not shown) with means (not shown) regulating the amount of water being delivered through conduit 75, thereby providing a means of automatic control of the density of the feed to the cones.

In a commercial embodiment of the invention, slime-containing Florida pebble phosphate matrix in an aqueous pulp was subjected to a flat screening operation on 1 mm. 8,000 gallons per minute of the underflow passing through the initial section of the flat screen were separately collected and passed through conduit 51 and hydroconed in eight hydrocones in parallel, as is illustrated in the drawings. 22,000 gallons per minute of the flat screen underflow were separately and simultaneously withdrawn through spout 37 and were passed to a 175 foot diameter hydro-separator. A series of tests were conducted at these conditions and the results are tabulated below in the table.

Table

HYDROCONES

| Test | | Percent −150 Mesh | Percent Solids | Grams +150 Mesh/ gallon Loss | Percent −150 Mesh Rejection | Tons per hr. Loss |
|---|---|---|---|---|---|---|
| #1 | Feed | 28.07 | 19.29 | 14.9 | 80.42 | 7.03 |
|  | Overflow | 94.51 | 6.85 |  |  |  |
|  | Underflow | 7.22 | 56.07 |  |  |  |
| #2 | Feed | 37.99 | 14.96 | 1.9 | 92.60 | 0.90 |
|  | Overflow | 99.14 | 5.63 |  |  |  |
|  | Underflow | 4.36 | 41.82 |  |  |  |
| #3 | Feed | 31.16 | 21.99 | 18.3 | 81.48 | 8.64 |
|  | Overflow | 93.92 | 7.57 |  |  |  |
|  | Underflow | 7.91 | 60.01 |  |  |  |

HYDROSEPARATOR

| Test | | Percent −150 Mesh | Percent Solids | Grams +150 Mesh/ gallon Loss | Percent −150 Mesh Rejection | Tons per hr. Loss |
|---|---|---|---|---|---|---|
| #1 | Feed | 25.57 | 17.71 | 13.66 | 75.44 | 17.73 |
|  | Overflow | 92.22 | 4.50 |  |  |  |
|  | Underflow | 7.94 | 25.52 |  |  |  |
| #2 | Feed | 23.52 | 23.56 | 19.83 | 73.56 | 25.74 |
|  | Overflow | 89.39 | 4.79 |  |  |  |
|  | Underflow | 7.71 | 27.05 |  |  |  |
| #3 | Feed | 28.45 | 23.89 | 25.99 | 78.41 | 33.74 |
|  | Overflow | 86.46 | 4.91 |  |  |  |
|  | Underflow | 8.28 | 28.08 |  |  |  |

The invention described affords an efficient and economical method and apparatus for the desliming of phosphate matrix. The deslimed material is of good quality and may be further sized and introduced to a benefication plant wherein it may be further beneficiated with the use of flotation reagents. The invention accordingly represents a significant contribution to the art.

The description of the invention utilized specific reference to certain process details; however, it is to be understood that such details are illustrative only and not by way of limitation. Other modifications and equivalents of the invention will be apparent to those skilled in the art from the foregoing description.

Having now fully described and illustrated the invention, what is desired to be secured and claimed by Letters Patent is set forth in the appended claims.

We claim:

1. A method of desliming phosphate matrix which comprises passing a water slurry of slime-containing phosphate matrix down an inclined flat screen, separately collecting the material which passes through an initial section of the flat screen in a first collecting zone and the material which passes through a succeeding section of the flat screen in a second collecting zone, maintaining a substantially constant pressure head in said first collecting zone, directly flowing material from said first collecting zone by gravity flow at a substantially uniform rate and at a substantially constant pressure provided by said pressure head to a hydroconing operation zone, and recovering the denser phase from the hydroconing operation.

2. A method of desliming phosphate matrix which comprises passing a water slurry of slime-containing phosphate matrix down an inclined flat screen, separately collecting the material which passes through an initial section of the flat screen in a first collecting zone and the material which passes through a succeeding section of the flat screen in a second collecting zone, maintaining a substantially constant pressure head in said first collecting zone, directly flowing material in said first collecting zone by gravity flow at a substantially uniform rate and at a substantially constant pressure provided by said pressure head to a hydroconing operation zone, introducing water into the material stream being flowed from said first collecting zone to said hydroconing operation zone at a rate to maintain the material introduced into said hydroconing operation zone at a substantially constant density, and recovering the denser phase from the hydroconing operation.

3. The method of claim 2 wherein the material which passes through an initial 30% section of the flat screen is separately collected in said first collecting zone.

4. The method of claim 2 wherein the substantially constant pressure head in said first collecting zone is maintained by withdrawing material from said first collecting zone at a rate less than it is introduced into said first collecting zone so that said collecting zone is maintained in overflowing condition.

5. An apparatus which comprises in combination an inclined flat screen having an initial section and a succeeding section, collecting means below said initial section of said flat screen for separately collecting material which passes through said initial section of said flat screen, a hydrocone below said collecting means, conduit means communicating with the interior of said collecting means and directly connecting said collecting means and said hydrocone for conducting material from said collecting means directly to said hydrocone, a water inlet conduit connected to said conduit means, a density measuring device operatively connected to the material in said conduit means, said density measuring device operatively connected to means for regulating the amount of water being delivered into said conduit means through said water inlet conduit to control the density of the material being introduced into said hydrocone.

6. An apparatus for desliming slime-containing ore which comprises in combination an elevated receptacle for receiving a water slurry of said ore, an inclined flat screen positioned adjacent to said receptacle so that the water slurry of slime-containing ore flowing from said receptacle flows down said inclined flat screen, said screen having an initial section and a succeeding section, a collecting means positioned below said initial section of said flat screen for separately collecting material which passes through said initial section of said flat screen, said collecting means including a baffle transverse to the incline of the flat screen positioned intermediate the ends of said screen to split the material which passes through said flat screen, said baffle extending upwardly so as to provide for maintaining a body of liquid within said collecting means at the predetermined level of the upper edge of said baffle, at least one hydrocone positioned below said collecting means, conduit means directly connecting said collecting means and said hydrocone for conducting material from said collecting means upstream from said baffle directly to said hydrocone, a water inlet conduit connected to said conduit means, a density measuring device operatively connected to the material in said conduit means, said density measuring device operatively connected to means for regulating the amount of water being delivered into said conduit means through said water inlet conduit to control the density of the material being introduced into said hydrocone.

References Cited in the file of this patent

UNITED STATES PATENTS

| 1,700,925 | Dezurik | Feb. 5, 1929 |
| 2,163,927 | Wright | June 27, 1939 |
| 2,763,371 | Le Baron | Sept. 18, 1956 |
| 2,870,908 | Fitch | Jan. 27, 1959 |
| 2,941,783 | Stinson | June 21, 1960 |

FOREIGN PATENTS

| 505,651 | Canada | Sept. 7, 1954 |
| 726,616 | Great Britain | Mar. 23, 1955 |
| 726,757 | Great Britain | Mar. 23, 1955 |

OTHER REFERENCES

Engineering and Mining Journal, volume 151, Number 11, November 1950, pages 78–83.

Dahlstrom: Trans. AIME, volume 190, February 1951, Mining Engineering, page 162.